United States Patent [19]

Kita et al.

[11] Patent Number: 4,813,306
[45] Date of Patent: Mar. 21, 1989

[54] HYDROMECHANICAL TRANSMISSION

[75] Inventors: Yasuo Kita; Ryosuke Sugawara, both of Kyoto, Japan

[73] Assignee: Shimadzu Corporation, Kyoto, Japan

[21] Appl. No.: 921,099

[22] Filed: Oct. 21, 1986

[51] Int. Cl.⁴ .............................................. F16H 47/04
[52] U.S. Cl. ....................................... 74/687; 74/720
[58] Field of Search ................. 74/687, 677, 681, 720, 74/720.5, 718

[56] References Cited

U.S. PATENT DOCUMENTS

| | | | |
|---|---|---|---|
| 3,714,845 | 2/1973 | Mooney, Jr. | 74/687 |
| 3,722,324 | 3/1973 | Cordner et al. | 74/687 |
| 3,903,755 | 9/1975 | Polak | 74/687 |
| 3,979,972 | 9/1976 | Sakai et al. | 74/687 |
| 4,286,477 | 9/1981 | Meyerle et al. | 74/687 |
| 4,304,151 | 12/1981 | Meyerle et al. | 74/687 |
| 4,306,467 | 12/1981 | Pollman | 74/687 |
| 4,313,351 | 2/1982 | Hagin | 74/687 |
| 4,341,131 | 7/1982 | Pollman | 74/687 |
| 4,341,132 | 7/1982 | Burkick | 74/687 |
| 4,446,756 | 5/1984 | Hagin et al. | 74/687 |
| 4,491,034 | 1/1985 | Fredriksen | 74/687 |

Primary Examiner—Dirk Wright
Assistant Examiner—David Novais
Attorney, Agent, or Firm—Armstrong, Nikaido, Marmelstein & Kubovcik

[57] ABSTRACT

A hydromechanical transmission that can be used as a simple and efficient continuously variable transmission includes a differential mechanism for forming either a first mehanical transfer line for high speeds or a second mechanical transfer line for low speeds, a hydraulic power transmission mechanism having a hydraulic pump/motor, and a mode selector mechanism for selecting either a low-speed mode or a high-speed mode. In the low-speed mode, the output is connected to the input via the second mechanical transfer line. In the high-speed mode, the output is connected to the input via the first mechanical transfer line. One of the hydraulic pump/motors has a fixed displacement, while the other hydraulic pump/motor has a variable displacement.

1 Claim, 2 Drawing Sheets

HYDROMECHANICAL TRANSMISSION

FIELD OF THE INVENTION

The present invention relates to a hydromechanical transmission which can be used in various industrial fields as an efficient nonstep continuously variable transmission.

BACKGROUND OF THE INVENTION

A hydrostatic power transmission which uses a pair of hydraulic pump/motors and is employed as a continuously variable transmission has been known. The conventional transmission has the advantage that speed can be continuously varied. However, when it is used to drive a device that can be run with low torque at high speeds, such as a winder or centrifugal separator, both of the hydraulic pump/motors are required to have variable displacement; otherwise, efficient operation would not be attained. A hydrostatic power transmission used to drive such a device is shown in FIG. 3, where the hydraulic pump/motors p and q, of variable displacement type, re connected in series with each other via a hydraulic circuit r. (A booster circuit and other circuits are omitted in the figure.) For example, power from a prime mover is applied to hydraulic pump/motor p, and the power delivered from the other pump/motor q can be transmitted to the rotor of a centrifugal separator, the drive wheels of an automobile, or the like. The transmission is controlled as shown in FIG. 4 from a start to a stationary operation at a high-speed in order to improve the efficiency of the system as much as possible.

More specifically, when it is started, the displacement of the pump/motor q on the output side is fixed at its maximum value, while the displacement of the other pump/motor p on the input side is made to be zero. Then, the displacement of the pump/motor p acting as a pump on the input side is gradually increased. Thus, the hydraulic pump/motor q functioning as a motor on the output side, increases the rotational speed while maintaining a high torque. When the displacement of the pump/motor p on the input side reaches the maximum, the control over the displacement of the pump/motor p ceases. Then, the displacement of the pump/motor q on the output side is gradually reduced. Thus, the rotational speed of the pump/motor q on the output side is increased while the torque is decreased until stationary operation at a certain high-speed is reached. That is, the transmission is operated with a constant torque at low speeds until the displacement of the pump/motor p on the input side reaches its maximum value. Thereafter, the displacement of the pump/motor q on the output side is controlled, and the transmission is operated with a constant horsepower at high speeds. Therefore, the transmission can operate efficiently, taking full advantage of its characteristics.

In general, hydraulic pump/motors of a variable displacement type have many, accurately manufactured movable parts and are very complex in structure. Therefore, where such hydraulic pump/motors are both used, the whole structure of the transmission is complex and expensive to manufacture. Since the displacements of the pump/motors must be separately controlled, the control system is made more complex, and the cost is necessarily increased. Another disadvantage arises from the fact that hydraulic pump/motors of the variable displacement type leak somewhat more working fluid than the pump/motors of fixed displacement type, because the former type incorporates more movable seals. Therefore, the variable-displacement type tends to produce slightly larger energy loss than the fixed-displacement type. This might adversely affect the efficiency of the whole system.

SUMMARY OF THE INVENTION

It is the object of the present invention to provide a hydromechanical transmission which completely solves the foregoing problem.

The object is achieved by a hydromechanical transmission comprising: a differential mechanism having first, second, and third input/output ends and forming either a first mechanical transfer line for low speeds between the first and second input/output ends or a second mechanical transfer line for high speeds between the first and third input/output ends; a hydraulic power transmission mechanism having a pair of hydraulic pump/motors, the input/output ends of the pump/motors being connected to the second and third input/output ends, respectively, of the differential mechanism, the pump/motors cooperating with one another to constitute variable-speed hydraulic power transmission lines, one of the hydraulic pump/motors being a fixed displacement type, the other pump/motor being a variable displacement type; and a mode selector mechanism for selecting a low-speed mode, in which the output of the hydromechanical transmission is connected to the input via the first mechanical transfer line, or a high-speed mode, in which the output is connected to the input via the second mechanical transfer line.

In the low-speed mode, the output is connected to the input via the first mechanical transfer line for low speeds, the line being formed between the first and second input/output ends of the differential mechanism. A portion of the applied power is delivered through this line. The remaining power is transmitted toward the output via the hydraulic power transmission line formed by the hydraulic power transmission mechanism. In this case, one of the pump/motors that acts as a pump has a variable displacement, which is varied from zero to its maximum value so that the other pump/motor functioning as a motor increases its rotational speed with a constant high torque. The output of the hydromechanical transmission shows similar characteristics.

In the high-speed mode, the output is connected to the input via the second mechanical transfer line for high speeds, the line being formed between the first and third input/output ends of the differential mechanism. A portion of the applied power is delivered through this line. The remaining power is transmitted toward the output via the hydraulic power transmission line formed by the hydraulic power transmission mechanism. At this time, the roles of the pump/motors, i.e., function of the pump and the motor, are interchanged. That is, the pump/motor of variable displacement type then acts as a pump. Therefore, the displacement of the pump/motor of variable displacement type is reduced from its maximum value towards zero in the manner opposite to the foregoing, so that the hydraulic pump/motor of variable displacement type increases its speed of rotation. The output of the hydromechanical transmission shows similar characteristics.

DETAILED DESCRIPTION OF THE INVENTION

Figure 1:
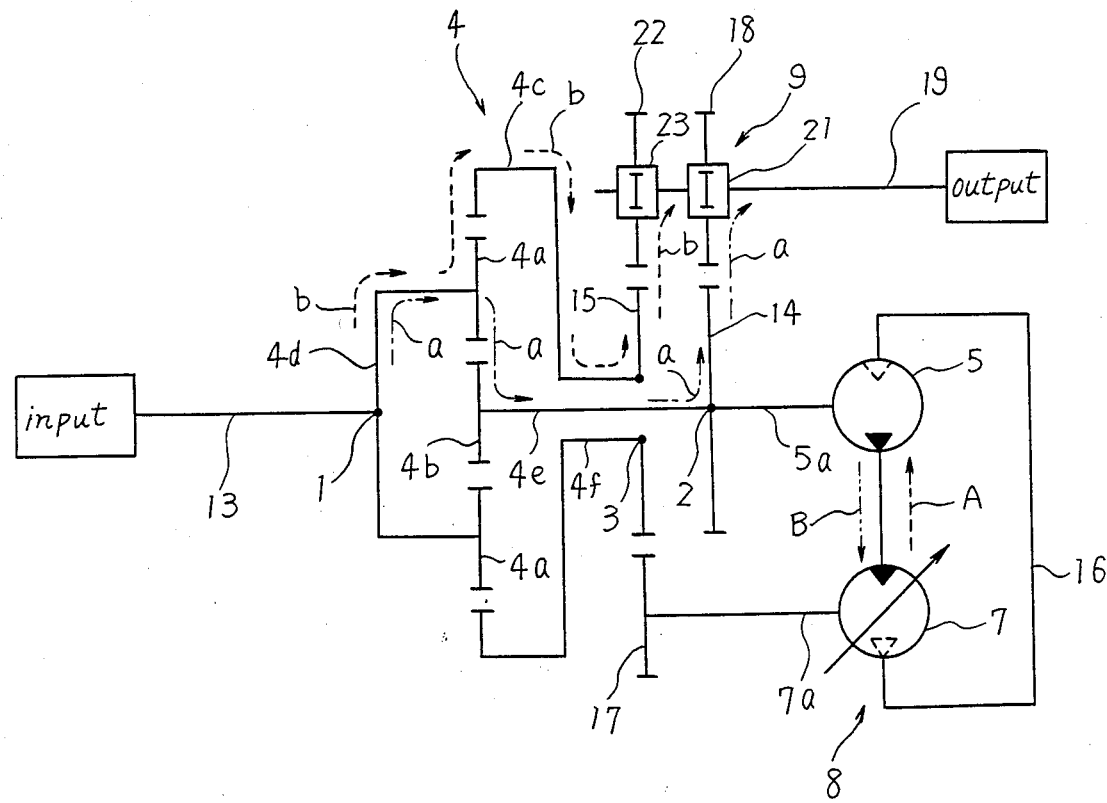
FIG. 1 is a flow line diagram of a hydromechanical transmission according to the invention.
Figure 2:
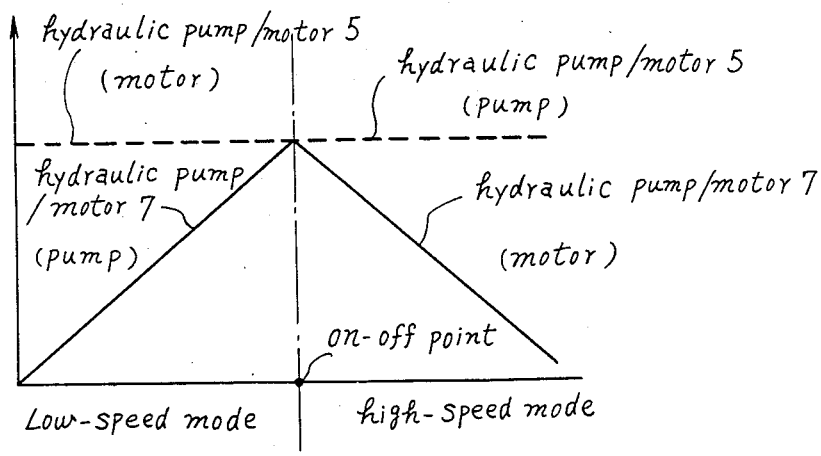
FIG. 2 is a graph illustrating the operation of the transmission shown in FIG. 1.
Figure 3:
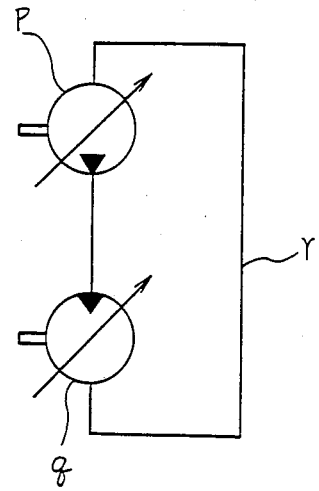
FIG. 3 is a circuit diagram of a conventional hydrostatic transmission.
Figure 4:
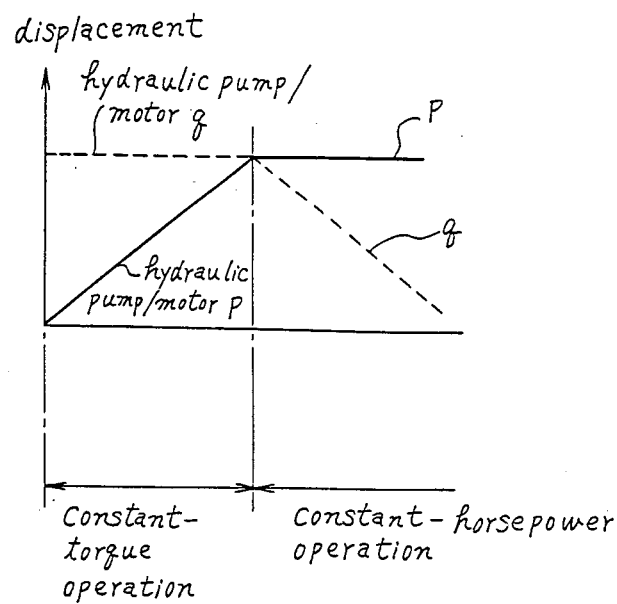
FIG. 4 a graph illustrating the operation of the conventional transmission shown in FIG. 3.

A hydromechanical transmission according to the instant invention is schematically shown in FIG. 1. The transmission has a differential mechanism 4, a hydraulic power transmission mechanism 8, and a mode selector mechanism 9. The differential mechanism 4 has first, second, and third input/output ends 1, 2, and 3, respectively, and forms either a first mechanical transfer line a for low speeds between the first input/output end 1 and the second input/output end 2 or a second mechanical transfer line b for high speeds between the first end 1 and the third end 3. A hydraulic pump/motor 5 of fixed displacement type has an input/output end 5a connected to the second input/output end 2 of the differential mechanism 4. A hydraulic pump/motor 7 of a variable displacement type, has an input/output end 7a coupled to the third input/output end 3. The pump/motors 5 and 7 cooperate with one another to constitute variable-speed hydraulic transmission lines A and B. The mode selector mechanism 9 selects either a low-speed mode, in which the output is connected to the input via the first mechanical transfer line a, or a high-speed mode, in which the output is connected to the input via the second mechanical transfer line b.

The differential mechanism 4 is a planetary gear train consisting of planet gears 4a circumferentially and regularly spaced apart from one another and a sun gear 4b disposed inside the planet gears 4a. The planet gears 4a are in mesh with an outside ring gear 4c. The planet gears 4a are held by a gear retainer 4d. The first input/output end 1 is provided at the center of retainer 4d. An input shaft 13 is mounted to the end 1. The sun gear 4b is supported on a pivot 4e, which is used as the second input/output end 2. A gear 14 is fixedly secured to the second end 2. The ring gear 4c has a boss 4f that is used as the third input/output end 3. A gear 15 is coupled to the third end 3.

In the hydraulic power transmission mechanism 8, the pump/motor 5 of a fixed displacement type is connected in series with the pump/motor 7 of a variable displacement type via a hydraulic circuit 16, in the same manner as in an ordinary hydrostatic power transmission. The input/output shaft 5a of the pump/motor 5 is coupled to the pivot 4e of the sun gear 4b. The input/output shaft 7a of the pump/motor 7 is connected to the ring gear 4c via a gear 17.

The mode selector mechanism 9 has a low-speed clutch 21 inserted between a low-speed gear 18 and the output shaft 19 of the transmission. The gear 18 meshes with the gear 14 at the second input/output end 2. The mechanism 9 further has a high-speed clutch 23 inserted between a high-speed gear 22 and the output shaft 19, the gear engaging with the gear 15 at the third input/output end 3.

In this embodiment, rotary power from an electric motor or the like is applied to the input shaft 13 mounted at the first input/output end 1 of the differential mechanism 4. Then, rotary power is delivered from the output shaft 19 which is connected to the second input/output end 2 or the third input/output end 3 of the differential mechanism 4 via the mode selector mechanism 9. The power is then transmitted to a take-up roller or the like.

In the operation of the hydromechanical transmission constructed as described above, when the low-speed mode is selected, the low-speed clutch 21 is engaged and the high-speed clutch 23 is disengaged. Under the low-speed mode, the output is connected to the input through the low-speed mechanical transfer line a formed between the first end 1 and the second end 2 of the differential mechanism 4. Thus, a portion of the applied power is transmitted to the output shaft 19 via the mechanical transfer line a. At this time, the pump/motor 7 of the variable displacement type functions as a pump, while the pump/motor 5 of the fixed displacement type acts as a motor. Accordingly, the rotary power appearing at the third end 3 of the differential mechanism 4 is transmitted to the output shaft 19 via the hydraulic transmission line A that is formed between the pump/motor 7 and the pump/motor 5. In the low-speed mode, as the displacement of the pump/motor 7 is increased, the rotational speed of the output shaft 19 increased relative to the rotational speed of the input shaft 13. Specifically, when the displacement of the pump/motor 7 of the variable displacement type is zero, the third input/output end 3 of the differential mechanism 4 is substantial at idle. Therefore, the output shaft 19 connected to the second input/output end 2 of the differential mechanism 4 is substantially at a standstill. Then, as the displacement of the pump/motor 7 is increased, the rotational speed at the third end 3 decreases relatively, and the speed at the second end 2 increases relatively, and when the two speeds are equal, the clutch 21 of the mode selector mechanism 9 is disengaged, while the high-speed clutch 23 is engaged to select the high-speed mode.

In the high-speed mode, the mechanical transfer line b is formed between the first end 1 and the third end 3 of the differential mechanism 4, and a portion of the applied power is transmitted to the output shaft 19 via this line b. At this time, the pump/motor 7 of the variable displacement type functions as a motor, whereas the pump/motor 5 of fixed displacement type acts a pump. Thus, the rotary power appearing at the second end 2 of the differential mechanism 4 is transmitted to the output shaft 19 via the hydraulic transmission line B that is formed between the hydraulic pump/motor 5 and the hydraulic pump/motor 7. In the high-speed mode, as the displacement of the pump/motor 7 is reduced, the rotational speed of the output shaft 19 increases relative to the rotational speed of the input shaft 13. In other words, as the displacement of the pump/motor 7 is reduced, the speed at the third end 3 increases relatively, while the rotational speed at the second end 2 decreases relatively.

Since the hydromechanical transmission is designed as described thus far, it is capable of being used for acceleration making use of high torque in the low-speed mode. On the other hand, in the high-speed mode, it is able to run at high speeds with low torque. Also, in this transmission, the roles of the pump/motors 5 and 7, making a pair, are interchanged between the low-speed and high-speed modes. For this reason, constant-torque operations can be performed in the low-speed mode and constant-horsepower operation can be effected in the high-speed mode, by means of the structure in which the displacement of pump/motor 7 is variable, and the displacement of the other pump/motor 5 is fixed. Consequently, the transmission requires many fewer accurately manufactured parts than the transmission in which both hydraulic pump/motors have variable displacement. Hence, the novel transmission is simplier in structure and less expensive to manufacture than the conventional transmission. Further, the control system can be rendered simple in structure, because what is needed is only the on-off switching between the clutches 21 and 23 and the control over the variable displacement of pump/motor 7 of the hydraulic pump/motors. In addition, the energy loss which would have been caused by movable seals for varying displacement can be reduced by half. In this way, the efficiency of the whole system can be enhanced without introducing difficulties.

Although the differential mechanism is not limited to a planetary gear train, the use of such a gear train facilitates making the system compact. Also, in the embodiment, the differential mechanism is disposed on the input side to divide the input power. The invention is not limited to this structure. For example, it is also applicable to a structure where the output power is divided.

Since the instant transmission is constructed as described above, only making one of the pair of hydraulic pump/motors to have a variable displacement, it permits transmission control in a system where high-torque operation is needed at low speeds, and low-torque is required at high speeds. Therefore, the transmission is made up of a fewer number of accurately manufactured parts than the conventional transmission in which the hydraulic pump/motors have variable displacement and which exhibits similar control characteristics. Hence, the instant transmission is simple in structure and inexpensive to fabricate. Also, the control system can be made simple. Furthermore, the efficiency of the system can be improved.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description. All changes which come within the meaning and range of equivalency of the claims are, therefore, to be embraced therein.

We claim:
1. A hydromechanical transmission, comprising:
(a) a differential mechanism having first, second, and third input/output ends and forming either a first mechanical transfer line for low speeds between the first and second input/output ends or a second mechanical transfer line for high speeds between the first and third input/output ends;
(b) a hydraulic power transmission mechanism having a pair of hydraulic pump/motors including a first fixed displacement pump/motor and a second variable displacement pump/motor, wherein an input/output end of said first pump/motor is directly connected to said second input/output end of said differential mechanism, and an input/output end of said second pump/motor is connected to said third input/output end of said differential mechanism through a first pair of meshing gears, wherein the input/output ends of the first and second pump/motors are disposed on the same side of said hydraulic power transmission mechanism, such that said pump/motors cooperate with one another to constitute variable-speed hydraulic power transmission lines; and
(c) a mode selector mechanism for selecting a low-speed mode, in which the output of the hydromechanical transmission is connected to the input via the first mechanical transfer line, or a high-speed mode, in which the output is connected to the input via the second mechanical transfer line, and
wherein said differential mechanism is a planetary gear train, and the input/output end of said first pump/motor is directly connected to an output shaft of a sun gear of said planetary gear train, and wherein the input/output end of said second pump/motor is connected through said first pair of meshing gears to a ring gear of said planetary gear train, and further wherein the sun gear of said first mechanical transfer line is connected to a low speed clutch, for connecting to the output of said hydromechanical transmission, through a second pair of meshing gears, and said second mechanical transfer line is connected to a high speed clutch, for connecting to the output of said hydromechanical transmission, by a third pair of meshing gears, such that said low and high speed clutches are connected adjacent one another and in-line on an output shaft of the output of said hydromechanical transmission, and also such that said second and third pairs of meshing gears are also positioned adjacent one another.

* * * * *